US008206850B2

(12) United States Patent
Hano et al.

(10) Patent No.: US 8,206,850 B2
(45) Date of Patent: Jun. 26, 2012

(54) ALKALINE BATTERY AND BATTERY PACK

(75) Inventors: Masatoshi Hano, Osaka (JP); Yasuhiko Syoji, Osaka (JP)

(73) Assignee: Panasonic Corporation, Osaka (JP)

( * ) Notice: Subject to any disclaimer, the term of this patent is extended or adjusted under 35 U.S.C. 154(b) by 723 days.

(21) Appl. No.: 12/327,565

(22) Filed: Dec. 3, 2008

(65) Prior Publication Data

US 2009/0145803 A1  Jun. 11, 2009

(30) Foreign Application Priority Data

Dec. 7, 2007 (JP) ................................. 2007-317429
May 8, 2008 (JP) ................................. 2008-122612

(51) Int. Cl.
*H01M 2/08* (2006.01)
*H01M 2/14* (2006.01)

(52) U.S. Cl. .................... 429/174; 429/185; 429/247
(58) Field of Classification Search .................. 429/174, 429/185, 247
See application file for complete search history.

(56) References Cited

U.S. PATENT DOCUMENTS

2006/0172193 A1  8/2006  Iwamoto et al.

FOREIGN PATENT DOCUMENTS

| JP | 02-150660 | 12/1990 |
| JP | 05-089861 | 4/1993 |
| JP | 5-34188 | 5/1993 |
| JP | 2000-090939 | 3/2000 |
| JP | 2002-151017 | 5/2002 |
| JP | 2004-139843 | 5/2004 |
| JP | 2006-019094 | 1/2006 |
| JP | 2006-244989 | 9/2006 |
| JP | 2007-27046 | 2/2007 |
| JP | 2008-071541 | 3/2008 |

OTHER PUBLICATIONS

JP 2002-151017-Translation.*
Japanese Office Action, with English translation, issued in Japanese Patent Application No. 2008-122612, dated Aug. 5, 2009.
Japanese Office Action, with English translation, issued in Japanese Patent Application No. 2008-122612, dated Aug. 5, 2008.

* cited by examiner

*Primary Examiner* — Patrick Ryan
*Assistant Examiner* — Ladan Mohaddes
(74) *Attorney, Agent, or Firm* — McDermott Will & Emery LLP

(57) ABSTRACT

A positive electrode and a gelled negative electrode are stored with a separator interposed therebetween in a battery case and an opening portion of the battery case is sealed with a gasket. The battery case is formed so that a thickness of a body portion thereof is smaller than a thickness of an opening portion thereof, the gasket includes a center portion, an outer circumference portion and a connection portion, an edge portion of the separator is in contact with the connection portion and bent toward the center portion and contact part of the edge portion with the connection portion has a length in a range of 1.5 mm to 2.5 mm, and the positive electrode contains at least manganese dioxide and graphite and a mixture ratio by weight of manganese dioxide and graphite is within a range of 92.6/7.4 to 94.0/6.0.

4 Claims, 6 Drawing Sheets

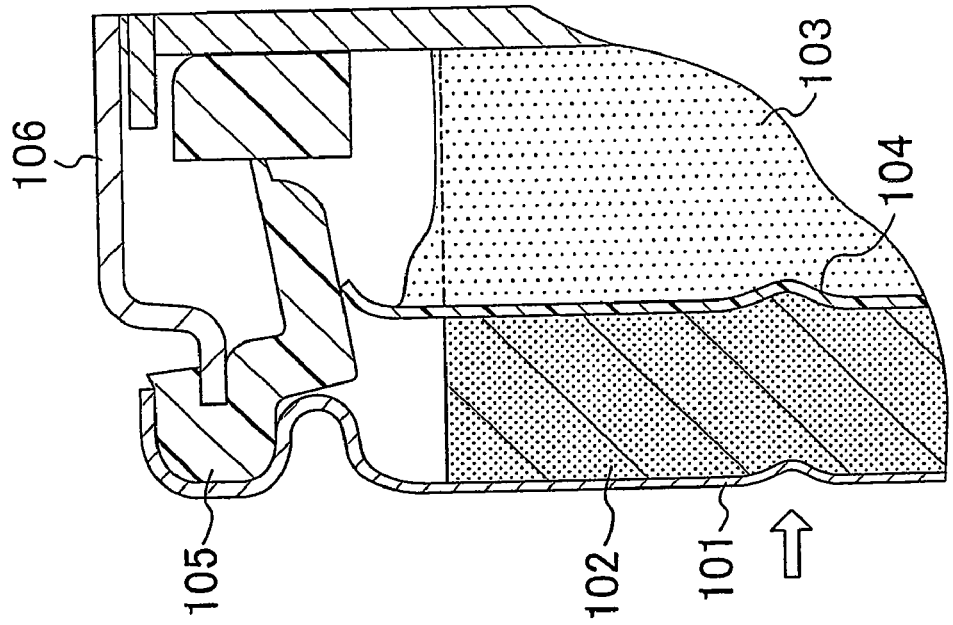
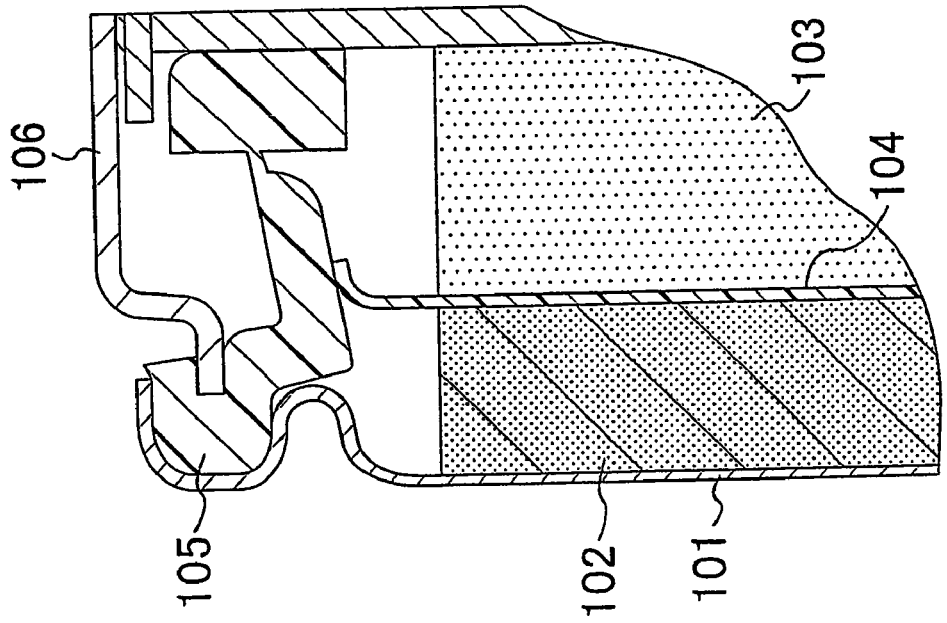

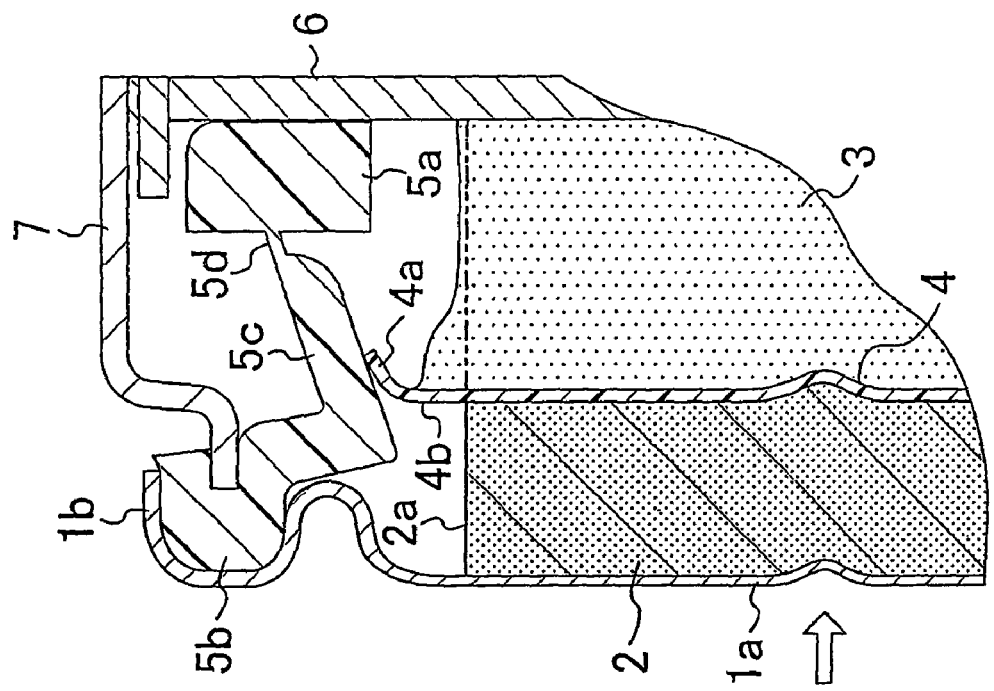
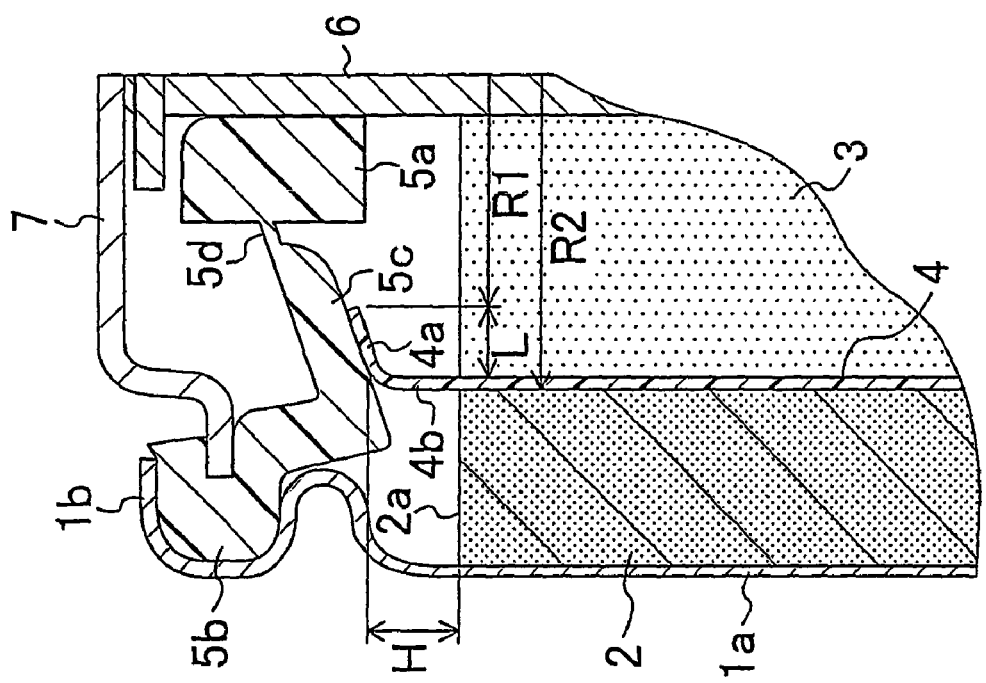

ALKALINE BATTERY AND BATTERY PACK

BACKGROUND OF THE INVENTION

The present invention relates to an alkaline battery and a battery pack including a plurality of alkaline batteries which are packaged therein.

As shown in FIG. 6, a typical structure of an alkaline battery includes: a hollow cylindrical positive electrode 102, a cylindrical separator 104 with a bottom and a gelled negative electrode 103 which are provided in a cylindrical battery case 101 with a bottom. In the positive electrode 102 and the separator 104, an alkaline electrolyte is injected. An opening portion of the battery case 101 is sealed by crimping with a negative electrode terminal plate 106 and a gasket 105.

Since the gelled negative electrode 103 has a fluidity, there arises a problem in which, when a vibration or an impact is applied to the battery, the gelled negative electrode 103 leaks out between the separator 104 and the gasket 105 to the positive electrode 102 side and causes an internal short-circuit. Specifically, when a reaction area is increased by using rounded zinc alloy power, which is a negative electrode active material, in order to increase a discharge capacity of the alkaline battery, a viscosity of the gelled negative electrode 103 is reduced and thus the above-described internal short-circuit is easily caused.

To cope with the above-described problem, conventionally, such leakage of a gelled negative electrode is prevented by adjusting a composition of materials of a separator or reducing a fiber orientation of a separator to improve a strength of the separator (see Japanese Patent Laid-Open Publication No. 2006-019094 and Japanese Patent Laid-Open Publication No. 2000-090939), or by providing a convex-shape bent portion at an edge portion of the separator to improve strength of contact between a separator and a gasket when the separator is attached to the gasket by pressure (see Japanese Patent Laid-Open Publication No. 2004-139843).

To increase a discharge capacity of an alkaline battery, it is effective to reduce a thickness of a battery case and correspondingly increase an inner volume of the battery. However, if the thickness of the battery case is reduced, a crimp strength of a sealing portion of the battery case is reduced and might cause leakage of an electrolyte from the sealing portion. As a measure to cope with this problem, the opening portion of the battery case is formed to have a larger thickness than a thickness of a body portion (Japanese Patent Laid-Open Publication No. 2002-151017 and Japanese Patent Laid-Open Publication No. 5-089861).

SUMMARY OF THE INVENTION

An alkaline battery according to the present invention is directed to an alkaline battery in which a positive electrode and a gelled negative electrode are stored with a separator interposed therebetween in a battery case having a cylindrical shape with a bottom and an opening portion of the battery case is sealed with a gasket and is characterized in that the battery case is formed so that a thickness of a body portion thereof is smaller than a thickness of an opening portion thereof, the gasket includes a center portion for holding a negative electrode current collector, an outer circumference portion in contact with the opening portion of the battery case and a connection portion for connecting the center potion and the outer circumference portion, and an edge portion of the separator is in contact with the connection portion and bent toward the center portion and contact part of the edge portion with the connection portion has a length in a range of 1.5 mm to 2.5 mm Using the above-described structure, even when a side surface of the battery case having a small thickness receives an impact and thus is deformed, the contact of the contact part of the edge portion of the separator with the gasket is maintained to be sufficiently strong, so that an outflow of the gelled negative electrode between the separator and the gasket to the positive electrode side can be prevented. Thus, a highly reliable alkaline battery having a large capacity, in which an internal short-circuit is not caused can be obtained.

The connection portion of the gasket is preferably slanted upward in the direction to the center portion at an angle within a range of 15 degrees to 40 degrees.

Thus, even when the contact part of the edge portion of the separator with the connection portion is shortened due to curvature of the separator caused by deformation of the battery case, the contact part smoothly moves along the slant of the connection portion. Thus, a predetermined length of the contact part can be maintained with the edge portion of the separator kept not separated from the connection portion and in contact with the connection portion.

In one preferred embodiment of the present invention, the battery case is formed so that the thickness of the body portion of the battery case is 20% to 50% smaller than the thickness of the opening portion of the battery case.

In one preferred embodiment of the present invention, the thickness of the body portion of the battery case is within a range of 0.10 mm to 0.15 mm.

In one preferred embodiment of the present invention, part of the separator which is not in contact with the positive electrode and the connection portion has a length of 1.5 mm or less.

In one preferred embodiment of the present invention, the positive electrode contains at least manganese dioxide and graphite and a mixture ratio by weight (which will be hereinafter merely referred to a "mixture ratio") of manganese dioxide and graphite is within a range of 92.6/7.4 to 94.0/6.0.

In one preferred embodiment of the present invention, the positive electrode contains an alkaline electrolyte containing water as a solvent and a water content of the positive electrode is within a range of 7.1 wt % to 8.1 wt %.

A battery pack according to the present invention is characterized by including a plurality of alkaline batteries according to the present invention being packaged using shrink-packaging technique, blister packaging technique or a paper container.

According to the present invention, even when a side surface of the battery case receives an impact and is deformed, the contact of the contact part of the edge portion of the separator with the gasket is maintained to be sufficiently strong, so that an outflow of the gelled negative electrode between the separator and the gasket to the positive electrode side can be prevented. Thus, a highly reliable alkaline battery having a large capacity in which an internal short-circuit is not caused can be obtained.

BRIEF DESCRIPTION OF THE DRAWINGS

FIGS. 2A and 2B are views of an alkaline battery according to the present invention, describing problems that the present invention is to solve. FIG. 2A is a partial cross-sectional view illustrating a structure of part of the alkaline battery around an opening portion. FIG. 2B is a partial cross-sectional view illustrating a state of the part of the alkaline battery around the opening portion when a depression is formed in a side surface of a battery case.

FIGS. 4A and 4B are views of an alkaline battery according to an embodiment of the present invention illustrating part of the alkaline battery around an opening portion. FIG. 4A is a partial cross-sectional view of the alkaline battery. FIG. 4B is a partial cross-sectional view illustrating a state of the alkaline battery when a depression is formed at a side surface of a battery case.

DESCRIPTION OF THE PREFERRED EMBODIMENTS

The present inventors examined alkaline batteries in which a battery case with a reduced thickness is provided, according to the above-described measure, thereby reducing a battery capacity, and found the following problems.

Figure 1:
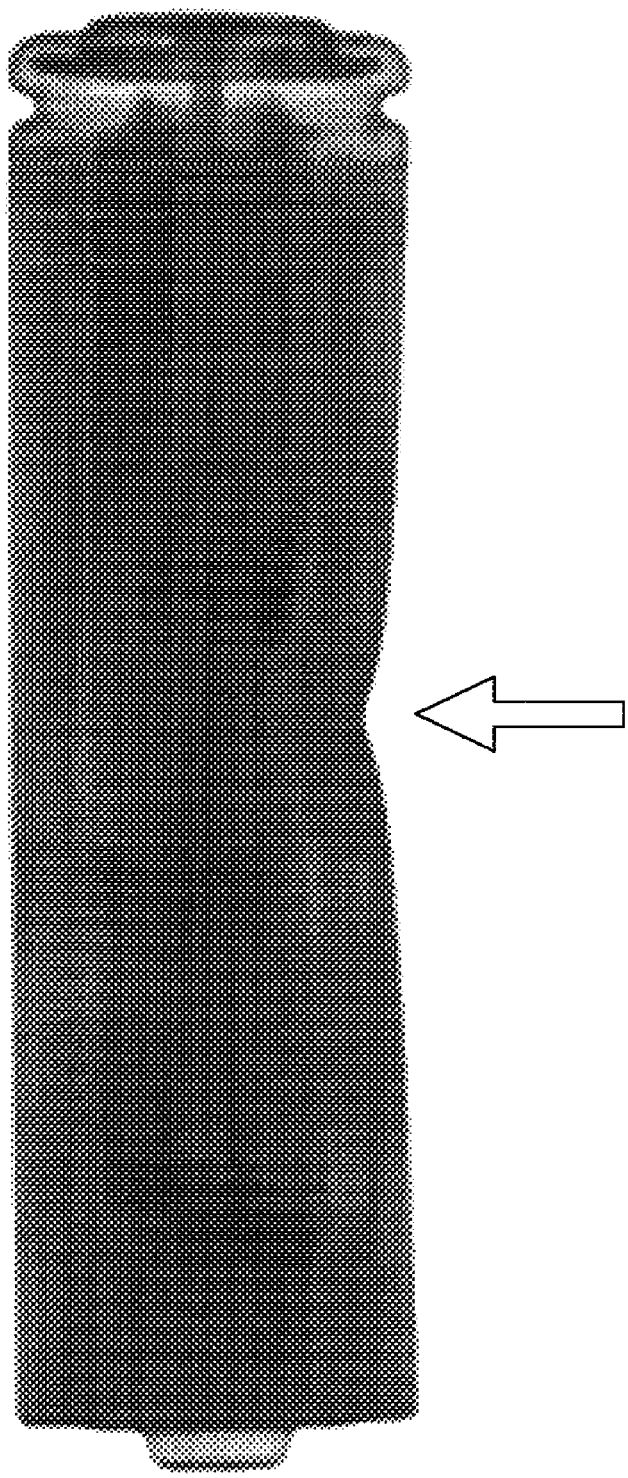
FIG. 1 is a photo of an alkaline battery according to the present invention, describing problems that the present invention is to solve.

There are cases where when a strong impact is given to a side surface of an alkaline battery, a depression is formed at the side surface of the battery, as shown in FIG. 1, because the thickness of a body portion of a battery case is small. From the examination, it was found that among batteries in which such depression was formed, there were some batteries in which an internal short-circuit occurred due to leakage of a gelled negative electrode between a separator and a gasket to a positive electrode side.

It is presumed that such internal short-circuit occurred for the following reason. Hereinafter, the reason will be described with reference to FIGS. 2A and 2B.

Figure 6:
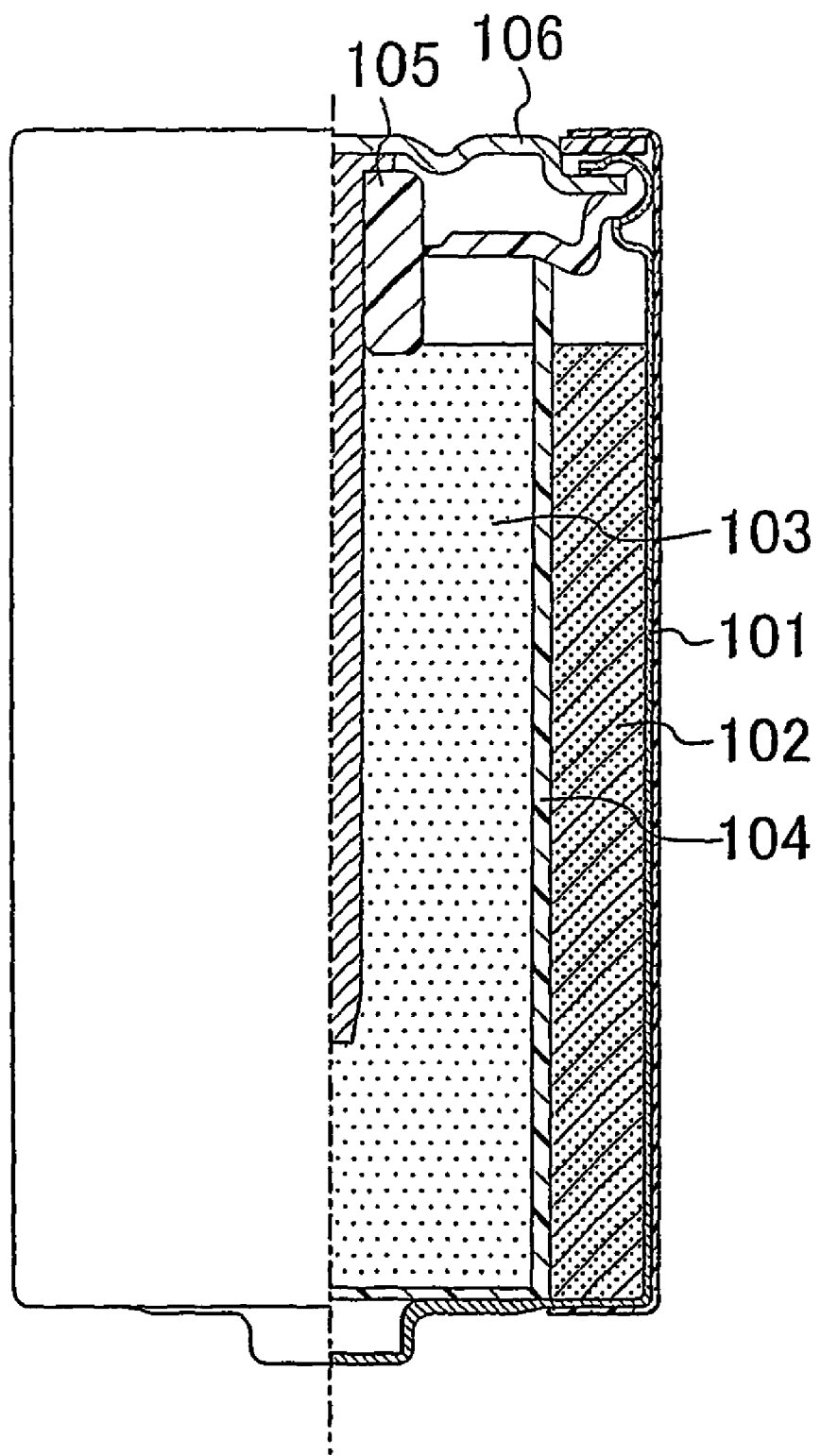
FIG. 6 is a half-sectional view illustrating a structure of a known alkaline battery.

FIG. 2A is a partial cross-sectional view illustrating a structure of an alkaline battery. Basically, the alkaline battery of FIG. 2A has the same structure as a structure of the alkaline battery of FIG. 6 and, in the alkaline battery of FIG. 2A, a positive electrode 102, a separator 104 and a gelled negative electrode 103 are provided in a battery case 101 and an opening portion of the battery case 101 is sealed by crimping with a negative electrode terminal plate 106 and a gasket 105. As shown in FIG. 2A, an edge portion of the separator 104 is in contact with the gasket 105, thereby preventing leakage of the gelled negative electrode 103 to the positive electrode 102 side.

FIG. 2B is a partial cross-sectional view illustrating a state of the alkaline battery when, as shown by an arrow, a large impact is applied to a side surface of the battery and a depression is formed in a side surface of the battery case 101. As shown in FIG. 2B, the depression formed in the side surface of the battery case 101 causes deformation of the positive electrode 102 located at an inner side of the battery case 101 and, furthermore, presses the separator 104 located at a further inner side of the battery case 101, so that a curved portion corresponding to the depression of the battery case 101 is formed in the separator 104. Accordingly, contact part of the edge portion of the separator 104 with the gasket 105 is pulled by the curved portion generated in the separator 104, so that a length of the contact part of the separator 104 is reduced.

Normally, since when the separator 104 having a cylindrical shape with a bottom is inserted in the battery case 101, a central axis of the separator 104 is tilted or when the edge portion of the separator 104 is pressed by the gasket 105, the edge portion of the separator 104 is not uniformly bent and the length of the contact part of the edge portion of the separator 104 with the gasket 105 varies by about 0.1 to 0.3 mm.

Therefore, it is assumed that when the separator 104 received a strong impact at the side surface of the battery and a curved portion was generated in the separator 104, strength of contact between the separator 104 and the gasket 105 was reduced at the contact part of the separator 104 of which the length had been reduced and, as a result, leakage of the gelled negative electrode 103 between the separator 104 and the gasket 105 at which the strength of the contact had been reduced to the positive electrode 102 side was caused.

An internal short-circuit caused by the above-described reason conspicuously occurs when the battery case 101 has a small thickness. Specifically, alkaline batteries are distributed in the form of "battery pack" in which a plurality of batteries are shrink-packaged with a heat-shrinkable film in the market and, if a battery pack obtained in such a packaging manner is accidentally dropped when being transported, unpacked, displayed or the like, since batteries are in close contact with each other in the shrink-packaged battery pack, a larger impact is applied to each alkaline dry battery therein, compared to the case where alkaline batteries are separately dropped, and therefore leakage might be caused. Therefore, assuming that alkaline batteries each including the battery case 101 with a reduced thickness and thus having an increased capacity are shrink-packaged and distributed in the market, when the battery pack is dropped or the like and a large impact is applied to the battery pack, the gelled negative electrode might flow out between the separator and the gasket to the positive electrode side to cause an internal short-circuit. However, conventionally, consideration has been hardly given to such internal short-circuit resulting from deformation of the battery case occurring in a battery pack packaged in such a packaging manner when the battery pack is dropped or the like and a large impact is applied.

The present invention has been devised, based on the above-described findings, and it is therefore an object of the present invention is to provide a highly reliable alkaline battery having a large capacity, in which an internal short-circuit is not caused even when the battery is accidentally dropped or the like and a battery case is deformed due to an impact from the dropping or the like.

To achieve the above-described object, an alkaline battery according to the present invention employs a structure in which a length of contact part of a separator edge portion with a gasket is set to be a predetermined length beforehand so that even when the separator is curved due to deformation of a battery case and the length of the contact part is reduced, an enough length of the contact part is ensured to maintain sufficiently strength of contact.

Specifically, an alkaline battery according to the present invention is directed to an alkaline battery in which a positive electrode and a gelled negative electrode are stored with a separator interposed therebetween in a battery case having a cylindrical shape with a bottom and an opening portion of the battery case is sealed with a gasket and is characterized in that the battery case is formed so that a thickness of a body portion thereof is smaller than a thickness of an opening portion thereof, the gasket includes a center portion for holding a negative electrode current collector, an outer circumference portion in contact with the opening portion of the battery case and a connection portion for connecting the center potion and the outer circumference portion, and an edge portion of the separator is in contact with the connection portion and bent toward the center portion and contact part of the edge portion with the connection portion has a length in a range of 1.5 mm to 2.5 mm.

Using the above-described structure, even when a side surface of the battery case having a small thickness receives an impact and thus is deformed, the contact of the contact part of the edge portion of the separator with the gasket is maintained to be sufficiently strong, so that an outflow of the gelled negative electrode between the separator and the gasket to the positive electrode side can be prevented. Thus, a highly reliable alkaline battery having a large capacity, in which an internal short-circuit is not caused can be obtained.

Hereinafter, embodiments of the present invention will be described with reference to the accompanying drawings. In the drawings, components having substantially the same function are denoted by the same reference numeral for the purpose of simplicity. Note that the present invention is not limited to the following embodiments.

Figure 3:
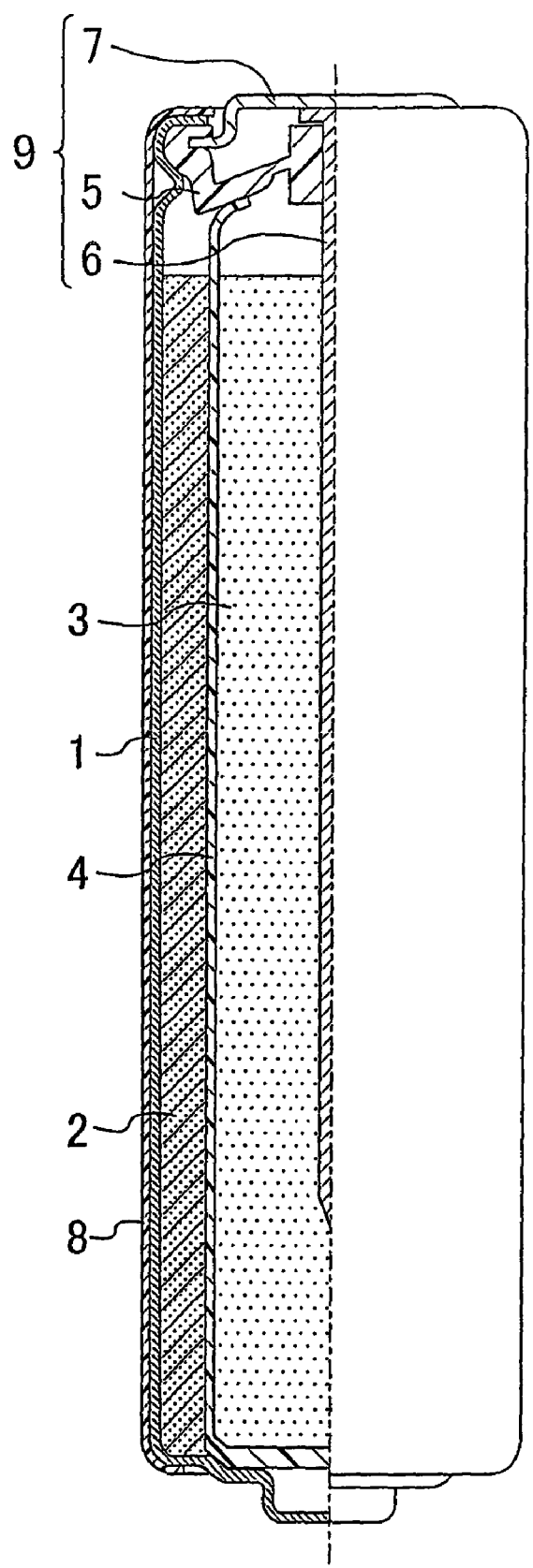
FIG. 3 is a view illustrating a structure of an alkaline battery according to an embodiment of the present invention.

FIG. 3 is a half sectional view illustrating a structure of an alkaline battery according to an embodiment of the present invention. FIG. 4A is a partial cross-sectional view illustrating a structure of part of the alkaline battery around an opening portion. FIG. 4B is a partial cross-sectional view illustrating a state of the part of the alkaline battery around the opening portion when a depression is formed at a side surface of a battery case.

As shown in FIG. 3, a positive electrode 2 and a gelled negative electrode 3 are stored in a battery case 1 having a cylindrical shape with a bottom with a separator 4 interposed between the positive electrode 2 and the gelled negative electrode 3 and an opening portion of the battery case 1 is sealed with a gasket 5 and a negative electrode terminal plate 7.

As shown in FIG. 4A, a body portion 1a of the battery case 1 is formed so as to have a smaller thickness than a thickness of an opening portion 1b of the battery case 1 and the gasket 5 includes a center portion 5a for holding a negative electrode current collector 6, an outer circumference portion 5b in contact with the opening portion 1b of the battery case and a connection portion 5c for connecting the center potion 5a and the outer circumference portion 5b. An edge portion of the separator 4 is in contact with the connection portion 5c and bent toward the center portion 5a. Contact part 4a of the edge portion of the separator 4 with the connection portion 5c has a length within a range of 1.5 mm to 2.5 mm and more preferably 2.0 mm to 2.5 mm.

As shown in FIG. 4B, when a strong impact shown by an arrow is applied to a side surface of the alkaline battery having the above-described structure and a depression is formed at a side surface of the battery case 1 (specifically, the body portion 1a with a reduced thickness), the depression formed in the body portion 1a of the battery case 1 causes deformation of the positive electrode 2 located at an inner side of the body portion 1a and presses the separator 4 located at a further inner side of the body portion 1a, so that a curved portion corresponding to the depression of the body portion 1a is generated in the separator 4. Accordingly, the contact part 4a of the edge portion of the separator 4 with the connection portion 5c of the gasket 5 is pulled by the bent portion generated in the separator 4, so that a length of the contact part 4a is reduced. However, since the length of the contact part 4a has been set to be large beforehand, sufficiently strong contact can be maintained at the contact part 4a even after the length is reduced.

Thus, even when the side surface of the battery case 1 having a small thickness receives an impact and is deformed, leakage of the gelled negative electrode 3 between the separator 4 and the gasket 5 (connection portion 5c) to the positive electrode 2 side can be effectively prevented. As a result, a highly reliable alkaline battery having a large capacity in which an internal short-circuit is not caused can be achieved.

In this structure, the connection portion 5c of the gasket 5 is preferably slanted upward in the direction to the center portion 5a. Thus, even when the part 4a of the edge portion of the separator 4 in contact with the connection portion 5c becomes shorter due to the separator 4 is curved due to deformation of the battery case 1, the contact part 4a smoothly moves along a slant of the connection portion 5c, so that with the edge portion of the separator 4 not separated from the connection portion 5c and in contact with the connection portion 5c, an enough length of the contact part 4a can be ensured to maintain sufficiently strong contact.

Note that the connection portion 5c is preferably slanted by an angle within a range of 15 degrees to 40 degrees. If the slant angle is smaller than 15 degrees, the edge portion of the separator 4 is in contact with the connection portion 5c and buckling might be caused in the contact part 4a when the edge portion is bent toward the center portion 5a. If the slant angle is larger than 40 degrees, pressing force of the connection portion 5c onto the contact part 4a of the separator 4, i.e., the strength of the contact is reduced.

The connection portion 5c does not have to have a linear cross section but, for example, may have a circular arc cross section. In this case, as the slant of the connection portion 5c, a tangent of an arc of the contact part of the separator 4 with the connection portion 5c preferably makes an angle within a range of 15 degrees to 40 degrees.

The present invention has been devised to effectively prevent an internal short-circuit caused by deformation of the battery case 1 when the battery case 1 in which the body portion 1a has a smaller thickness than the thickness of the opening portion 1b is used. However, the relationship between the respective thicknesses of the body portion 1a and the opening portion 1b of the battery case 1 is not particularly limited. For example, in an AA alkaline battery and an AAA alkaline battery, it is preferable that the thickness of the opening portion 1b of the battery case 1 is 0.18 mm to 0.22 mm and the thickness of the body portion 1a is 0.10 mm to 0.15 mm. Specifically, by setting the thickness of the body portion 1a to be about 17% to 55% smaller than the thickness of the opening portion 1b, an inner volume of the battery can be substantially increased while mechanical strength is maintained.

In a D battery and a C battery, it is preferable that the thickness of the opening portion 1b of the battery case 1 is 0.25 mm to 0.30 mm and the thickness of the body portion 1a is 0.15 mm to 0.20 mm. Specifically, by setting the thickness of the body portion 1a to be about 20% to 50% smaller than the thickness of the opening portion 1b, an inner volume of the battery can be substantially increased while mechanical strength is maintained.

As has been described, with the connection portion 5c of the gasket 5 slanted, even when the separator 4 is curved due to deformation of the battery case 1, the contact part 4a of the separator 4 smoothly moves along the slant of the connection portion 5c, so that an enough length of the contact part 4a can be ensured to maintain sufficiently strong contact. As shown in FIG. 4A, part 4b of the edge portion of the separator 4 which is neither in contact with the positive electrode 2 nor the connection portion 5c is self-supported part of the separator 4. If the self-supported part 4b is curved or bent due to deformation of the battery case 1, the contact part 4a, which is supposed to have a large length, might have a reduced length, or the contact part 4a might be separated from the connection portion 5c. Note that the gelled negative electrode 3 has a fluidity and thus the self-supported part 4b of the separator 4 is defined by part of the separator 4 which is not in contact with the positive electrode 2.

To prevent the above-described phenomenon, the length of the part (self-supported part) 4b of the edge portion of the separator 4 which is neither in contact with the positive electrode 2 nor the connection portion 5c is preferably set to be 1.5 mm or less. Thus, the length of the part 4b which is easily curved or bent is reduced, so that the occurrence of an internal short-circuit due to deformation of the battery case 1 can be effectively prevented. Note that this effect is exhibited when a strong impact is given to the battery case 1 and, as a result, the self-supported part 4b of the separator 4 is curved or bent even though the battery case 1 is not deformed.

When a battery pack in which alkaline batteries each including the battery case 1 with a reduced thickness and thus having an increased capacity are shrink-packaged is dropped, a very large impact is given to the battery pack. However, if alkaline batteries each having the structure according to the present invention are used, the occurrence of an internal short-circuit due to deformation of a side surface of a battery case of each of the batteries when the battery pack is dropped can be effectively prevented.

As has been described, the present invention exhibits the effect of preventing the occurrence of an internal short-circuit due to deformation of a side surface of a battery case by maintaining strong contact between a separator edge portion and a gasket even when the separator is curved according to the deformation at the side surface of the battery case. Furthermore, if a positive electrode which is located at an inner side of the battery case and indirectly receives an impact given to the battery case has impact relaxation properties, the occurrence of an internal short-circuit can be more effectively prevented.

In general, as the positive electrode, a material obtained by pressuring a mixture of a positive electrode active material impregnated with an alkaline electrolyte and a conductive agent into a pellet form is used. The present inventors examined the impact relaxation effect of the positive electrode using manganese dioxide serving as a positive electrode active material and graphite serving as a conductive agent in various different composition ratios. As a result, positive electrodes having a composition ratio between the manganese dioxide and graphite within a range of 92.6/7.4 to 94.0/6.0 exhibited the impact relaxation properties against an impact given to battery cases.

A possible reason for this is that when the amount of graphite contained in the positive electrode becomes relatively large, graphite exhibiting excellent lubricity and mold-releasability becomes to largely affect the positive electrode, so that the positive electrode itself exhibits high deformability. Also, when the amount of manganese dioxide contained in the positive electrode becomes relatively large, manganese dioxide exhibiting higher hardness than that of graphite becomes to largely affect the positive electrode, so that the positive electrode itself exhibits vulnerability.

In general, the positive electrode contains an alkaline electrolyte containing water as a solvent. Positive electrodes of which a water content is within a range of 7.1 wt % to 8.1 wt % exhibited impact relaxation properties against an impact to battery cases. If a positive electrode exhibits a water content of 8.1 wt % or more, a strength of the positive electrode is reduced and therefore a water content of 8.1 wt % or more is not preferable. If a positive electrode exhibits a smaller water content than 7.1 wt %, reaction efficiency of the positive electrode active material is reduced and therefore a smaller water content than 7.1 wt % is not preferable.

Hereafter, referring to FIG. 3 again, a specific structure of each component of the alkaline battery according to the present invention will be described.

In the battery case 1 having a cylindrical shape with a bottom, the positive electrode 2 having a hollow cylindrical shape is stored. In a hollow portion of the positive electrode 2, the gelled negative electrode 3 is placed with the separator 4 having a cylindrical shape with a bottom and interposed between the positive electrode 2 and the gelled negative electrode 3. After electric power generation elements such as the positive electrode 2, the gelled negative electrode 3 and the like are stored in the battery case 1, the opening portion of the battery case 1 is sealed with an sealing unit 9 including the negative electrode current collector 6, the negative electrode terminal plate 7 electrically connected to the negative electrode current collector 6 and the gasket 5 which are united as one. An outer surface of the battery case 1 is coated by an exterior label 8.

The battery case 1 is formed of, for example, a nickel plated steel plate by press molding so as to have a predetermined shape having predetermined dimensions using a known method.

Each of the positive electrode 2, the separator 4 and the gelled negative electrode 3 contains an alkaline electrolyte. As the alkaline electrode, an aqueous solution containing, for example, 25 wt % to 40 wt % of potassium hydroxide and 1 wt % to 3 wt % of zinc oxide is used.

As the positive electrode 2, for example, a mixture of a powder positive electrode active material (having an average particle diameter of 10 μm to 50 μm) made of manganese dioxide (beta type, gamma type, lambda type, delta type or epsilon type), nickel oxyhydroxide, copper oxide or the like, a conductive agent made of graphite powder, carbon black, carbon fiber or the like and an alkaline electrolyte can be used. A binder such as polyethylene powder or the like or a lubricant such as stearate or the like may be added thereto.

As the gelled negative electrode 3, for example, an alkaline electrolyte which has been gelled by adding a gelling agent and in which zinc alloy powder serving as a negative electrode active material has been mixed dispersed can be used. Note that in order to suppress leakage out of the gelled negative electrode 3 to the positive electrode 2 side, the gelled negative electrode 3 is preferably adjusted to have a viscosity within a range of 50 MPa to 100 MPa seconds (at 20° C.) and have less fluidity. The viscosity can be measured by a commercially available B type viscometer.

In this case, as the gelling agent, a thickening agent made of carboxy vinyl polymer and salt thereof (for example, poly (meta) acrylate or metal salt thereof) or carboxy methyl cellulose and salt thereof, or powder or granulated powder of water absorptive polymer can be used.

Zinc alloy powder normally has an average particle diameter of 100 μm to 200 μm. However, in order to suppress the fluidity of the gelled negative electrode 3, elongated particles having an aspect ratio of 3 or more may be used.

As the separator 4, for example, a nonwoven fabric in which alkali resistant processed polyvinyl alcohol fiber and cellulose fiber are blended as main ingredients can be used. F3T grade products available from Kuraray Co., Ltd and VLR grade products available from Nippon Kodoshi Corporation are preferable. Note that as means for forming the separator 4 into an approximately cylindrical shape with a bottom, any method for separating the positive electrode 2 from the gelled negative electrode 3 may be used.

The gasket 5 is formed by injection molding so as to have a shape having a center portion 5a with a through hole through which the negative electrode current collector 6 is injected, a loop-like thin portion 5*d* which is provided around the center portion 5*a* and serves as a safety valve and an outer circumference portion 5*b* provided so as to extend from an outer circumference of the loop-like thin portion 5*d* via the connection portion 5*c*. As a material of the gasket 5, nylon, polypropylene or the like is used. As a material having alkali resistance and heat resistance, 6,6-nylon, 6,10-nylon, or 6,12-nylon may be used.

Hereinafter, example structures and effects of the present invention will be further described with reference to working examples of the present invention. However, the present invention is not limited to the following working examples.

The AA alkali battery (LR6) of FIG. 3 was formed by the following steps <1> through <8>.

<1> Battery Case

A can was formed from a nickel plated steel plate having a thickness of 0.35 mm, by press working, so as to have respective predetermined thicknesses at an opening portion and a body portion and also have an outer diameter of 13.92 mm and a height of 51.8 mm.

<2> Separator

A nonwoven fabric (having a basis weight of 36 g/m$^2$ and a thickness of 0.13 mm) formed with a cellulose fiber and a polyvinyl alcohol fiber blended at a weight ratio of 1:1 was cut into a rectangular shape having dimensions of 51 mm×57.5 mm.

The obtained nonwoven fiber was wound around a columnar rod having a diameter of 9.1 mm so that both of edge portions (along long sides) overlapped with each other, and part (along a short side) of the nonwoven fiber located beyond one of the edges of the rod were tucked inward and then was thermally welded to make this part serve as a bottom portion. Thus, a separator 4 having a cylindrical shape with a bottom was obtained.

Note that assuming that a length of the separator 4 from the bottom portion to an opening edge was a height of the separator 4, the separator 4 having the predetermined height was prepared.

<3> Sealing Unit

A gasket 5 was obtained by injection molding of 6,12-nylon into a predetermined shape having predetermined dimensions. Note that the connection portion 5*c* was slanted upward at an angle of 20 degrees in the direction to a center portion 5*a* from an outer circumference portion 5*b*. A negative electrode terminal plate 7 was formed by press molding of nickel plated steel plate having a thickness of 0.4 mm into a predetermined shape having predetermined dimensions. A negative electrode current collector 6 was obtained by press molding of brass into a nail shape having an entire length of 36.0 mm and a diameter of φ 1.40 at a body portion and then performing tin1-plating to a surface of the negative electrode current collector 6.

Then, after performing electric molding of the negative electrode terminal plate 7 and the negative electrode current collector 6, the negative electrode current collector 6 was injected through the through hold placed at the center of the gasket 5. Thus, a negative electrode current collector 6 was formed.

<4> Alkaline Electrolyte

An aqueous solution containing potassium hydrate in a predetermined weight parts and zinc oxide in 1 weight part was prepared.

<5> Forming of Positive Electrode

Electrolyte manganese dioxide powder having an average particle diameter of 35 μm and graphite powder having an average particle diameter of 15 μm were mixed at a predetermined ratio by weight. The mixture and an alkaline electrolyte (an aqueous solution containing 35 weight percent of potassium hydroxide and 2 weight percent of zinc oxide) were mixed at a ratio by weight of 100:2, and after sufficient agitation, the obtained mixture was compression-molded into the form of flakes. Thereafter, a positive electrode mixture in the form of flakes was pulverized into granular shape, was classified into 10-100 meshes and then was press-molded into a hollow cylindrical shape. Thus, a positive electrode mixture 2 in the form of pellet was obtained.

<6> Preparation of Gelled Negative Electrode

A thickening agent made of polyacrylate powder and absorptive polymer containing cross-linked polyacrylate sodium powder, which constitute a gelling agent, an alkaline electrolyte and zinc alloy powder were mixed at a ratio by weight of 0.26:0.54:35.2:64.0. Thus, a gelled negative electrode 3 was obtained.

Note that zinc alloy powder containing 0.020 weight percent of indium, 0.005 weight percent of bismuth and 0.005 weight percent of aluminum and having mainly particles with an aspect ratio of 3 or more and an average particle diameter of 170 μm was used. A viscosity of the gelled negative electrode 3 was adjusted to be 80 MPa seconds (20° C.).

<7> Assembling of Alkaline Battery

Two positive electrodes 2 were inserted in a battery case 1. Pressure was applied to the positive electrodes 2 by a pressing jig to lift the positive electrodes 2 to a predetermined height, and the positive electrodes 2 were made to be in close contact with an inner wall of the battery case 1. A separator 4 was disposed in the center of each of the positive electrodes 2 in close contact with the positive electrode case 1. The height of the separator 4 (i.e., an average value of heights of 10 separators) in this state was measured.

Next, a predetermined amount of an alkaline electrolyte was injected into the separator 4 and, after a lapse of 15 minutes, the height of the separator (i.e., an average value of heights of 10 separators) was measured.

Thereafter, 6.3 g of a gelled negative electrode 3 was filled in the separator 4. Then, after an opening edge portion of the battery case 1 was sealed by crimping it with a sealing unit 9 provided, an outer surface of the battery case 1 was coated by an exterior label 8.

<8> Forming Battery Pack

AA alkaline dry batteries were disposed such that twelve batteries as a unit were arranged in parallel with one another. Then, each unit of the batteries was covered by a heat-shrinkable film made of polyethylene terephthalate and having a thickness of 25 μm and were heated so that the film was shrunk, thereby obtaining battery packs.

The following dropping test was conducted to battery packs (of alkaline batteries) formed by the above-described steps.

Figure 5:
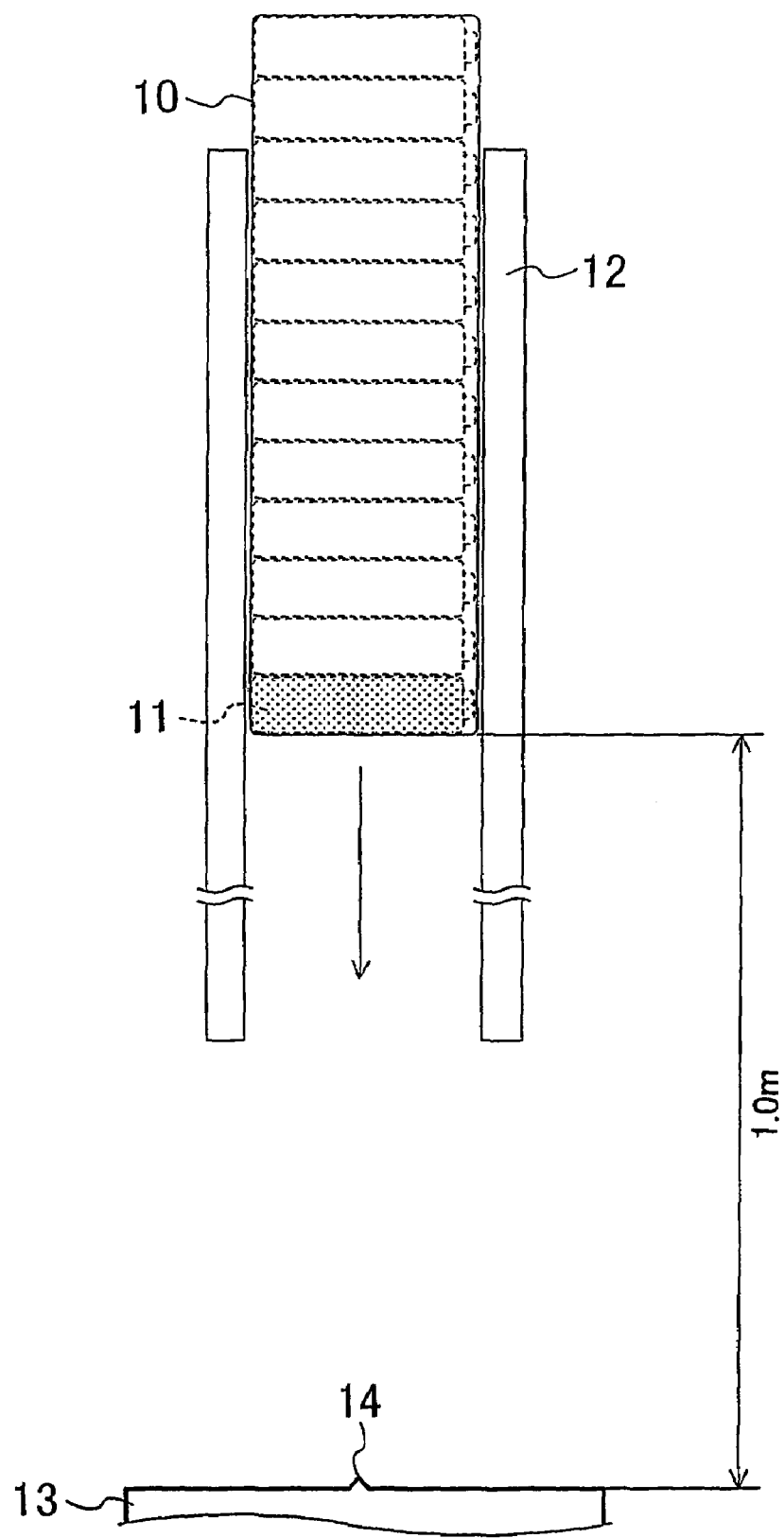
FIG. 5 is a view illustrating a method for a battery pack dropping test performed in working examples of the present invention.

FIG. 5 is a view illustrating a method for a battery pack dropping test. A dropping test was performed in the following manner: a battery pack 10 was naturally dropped along a guide 12 from a height of 1.0 m onto a test bench made of hard polyethylene and including a projection 14 with a height of 3 mm, thereby crashing a body portion of a test battery 11 into the projection 14.

The test battery 11 after the dropping test was evaluated in the following manner.

First, before performing a dropping test, a close circuit voltage of the test battery 11 was measured (with an accuracy of 1 mV). Immediately after a dropping test, the battery pack 10 was opened and the test battery 11 was taken out. An open circuit voltage of the test battery 11 was measured immediately after the dropping test and after a lapse of 1 minute. A highest surface temperature of the test battery 11 after the dropping test was measured by an infrared thermography. Note that the dropping test was performed to 10 packs at each time.

Change in the open circuit voltage of the test battery 11 was evaluated such that, in consideration of measurement error, when a voltage drop from a voltage value before dropping the test battery 11 to a voltage value immediately after dropping the test battery 11 was 2 mV or more, it was judged that the gelled negative electrode 3 leaked out to the positive electrode 2 side and caused an internal short-circuit.

It was considered that in batteries in which a difference in the open circuit voltage between a voltage value immediately after dropping the battery and a voltage value after a lapse of 1 minute from dropping the battery was less than 1 mV, a slight amount of the gelled negative electrode 3 leaked to the positive electrode 2 side and caused an internal short-circuit. However, it was also assumed that there was a very low risk of development of problems caused by the internal short-circuit in such batteries and thus it was judged that there was no practical problem in the batteries.

In contrast, it was judged that there was a high risk of development of problems in batteries in which a drop of the open circuit voltage from a voltage value immediately after a dropping test to a voltage value after a lapse of 1 minute was increased, and that reliability of the batteries was low.

Note that when the highest temperature of the surface of the test battery 11 exceeded 40° C. or more, which was higher than a human body temperature, it was considered that heat was generated and thus it was judged that reliability of batteries in which heat was generated was largely reduced.

<<Evaluation 1>>

First, using batteries which were formed so that respective thicknesses of body portions of their battery cases are different, the relationship between the length of the contact part 4a of the separator with the gasket and the occurrence of an internal short-circuit was evaluated.

Table 1 shows respective thicknesses of the opening portion and the body portion of the battery case in each of batteries used for the evaluation. Note that the concentration of potassium hydroxide in the alkaline electrolyte, the filling height of the positive electrode and the height of the separator were the same for all of the batteries. The mixture ratio by weight (which will be hereinafter merely referred to the "mixture ratio") of manganese dioxide powder and graphite powder was 94.0:6.0 and the injection amount of the alkaline electrode was 1.65 g.

[Table 1]

Table 2 shows evaluation results for open circuit voltage drop after a dropping test and heat generation for batteries which were formed so that respective contact parts of their separators with respective gaskets have different lengths (in other words, batteries formed according to different designed values for bending length).

[Table 2]

The length of the contact part of the separator with the gasket normally varies by about 0.1 mm to 0.3 mm in the step of sealing the battery case with the gasket after the separator was inserted into the battery case.

Table 2 shows, in addition to design values for the length of the contact part (i.e., bending length), the smallest length (corresponding to L in FIG. 4A) for the contact part, the radius (corresponding to R1 in FIG. 4A) of an approximate circle formed by an end face of the separator and the radius (corresponding to R2 in FIG. 4A) of an outer circumference of the separator for working examples. These values give a rough idea about variation of the length of the contact part but does not define the "contact part" in the present invention.

Table 2 also shows the length (corresponding to H in FIG. 4A) of self-supported part of the separator.

Note that the length of the contact part was measured, after the opening part of the battery case was decomposed and the sealing unit was taken out, by observing the contact part from directly above the contact part in the axial direction of the battery case using a stereoscopic microscope provided with an XY-stage.

As shown in Table 2, for batteries of Working Examples 2, 3, 4, 6, 7 and 8, excellent results in which the open circuit voltage did not drop after a lapse of 1 minute from the batteries were dropped were obtained. Specifically, for batteries of Working Examples 3, 4, 7 and 8, the voltage did not drop even immediately after the batteries were dropped and it was confirmed that those batteries were highly reliable.

The above-described evaluation shows that a highly reliable alkaline battery in which an internal short-circuit does not occur even when the battery is accidentally dropped or the like and a battery case is deformed due to an impact of the dropping can be achieved by setting the length of contact part of a separator with a gasket to be 1.5 mm to 2.5 mm and more preferably 2.0 mm to 2.5 mm.

For batteries of Comparative Example 9, even though the length of the contact part of the separator was small, i.e., 1.0 mm, excellent results in which the close circuit voltage did not drop were obtained. A possible reason for this is that since the thickness of the body portion of the battery case was large, i.e., 0.18 mm, the battery case was not deformed or, even if the battery case was deformed, the deformation was so slight that an internal short-circuit did not occur when receiving an impact.

<<Evaluation 2>>

Next, the relationship between the length of the self-supported part 4b of the separator and the occurrence of an internal short-circuit was evaluated.

Table 3 shows the filling height for positive electrodes of batteries used for the evaluation. Note that the respective thicknesses of the opening portion and the body portion of the battery case, the concentration of potassium hydroxide in the alkaline electrode and the height of the separator were the same for all of the batteries. The mixture ratio by weight (which will be hereinafter merely referred to the "mixture ratio") of manganese dioxide powder and graphite powder was 94.0:6.0 and the injection amount of the alkaline electrode was 1.65 g.

[Table 3]

Table 4 shows evaluation results for open circuit voltage drop after a dropping test and heat generation for batteries which were formed so that respective self-supported parts of their separators have different lengths (H).

[Table 4]

As shown in Table 4, for batteries of Working Examples 14 and 15, the voltage did not drop even immediately after the batteries were dropped and it was confirmed that those batteries were highly reliable. The above-described evaluation shows that the occurrence of an internal short-circuit due to deformation of the battery case can be effectively prevented by setting the length of the self-supported part of the separator to be 1.5 mm or less.

<<Evaluation 3>>

Next, the relationship between the concentration of potassium hydroxide in the alkaline electrolyte and the occurrence of an internal short-circuit was evaluated.

Table 5 shows the concentration of potassium hydroxide in the alkaline electrolyte for batteries used for the evaluation. Note that the respective thicknesses of the opening portion and the body portion of the battery case, the filling height of the positive electrode and the height of the separator were the same for all of the batteries. The mixture ratio of manganese dioxide powder and graphite powder was 94.0:6.0 and the injection amount of the alkaline electrode was 1.65 g.

[Table 5]

Table 6 shows evaluation results for open circuit voltage drop after a dropping test and heat generation for batteries which were formed so that the concentration of potassium hydroxide contained in the alkaline electrolyte were different between the batteries.

[Table 6]

As shown in Table 6, for batteries of Working Examples of 17 through 19, the voltage did not drop even immediately after the batteries were dropped and it was confirmed that those batteries were highly reliable. The above-described evaluation shows that the occurrence of an internal short-circuit due to deformation of the battery case can be effectively prevented by making the alkaline electrolyte contain 32% or more potassium hydroxide. When a polyvinyl alcohol fiber material is used for the separator and the concentration of potassium hydroxide is low, hydrolysis of the separator tends to proceed in the alkaline electrolyte. Therefore, by increasing the concentration of potassium hydroxide, reduction in strength of the separator with time in response to hydrolysis can be prevented.

<<Evaluation 4>>

Next, the relationship between the mixture ratio of manganese dioxide powder and graphite powder and the occurrence of an internal short-circuit was evaluated.

Table 7 shows the mixture ratio of manganese dioxide powder and graphite powder for batteries used in the evaluation. Note that the respective thicknesses of the opening portion and the body portion of the battery case, the concentration of potassium hydroxide in the alkaline electrolyte, the filling height of the positive electrode and the height of the separator were the same for all of the batteries. The injection amount of the alkaline electrode was 1.65 g.

[Table 7]

Table 8 shows evaluation results for open circuit voltage drop after a dropping test and heat generation for batteries which were formed so that the mixture ration of manganese dioxide powder and graphite powder were different between the batteries.

[Table 8]

As shown in Table 8, for batteries of Working Examples 21 through 24, the voltage did not drop even immediately after the batteries were dropped and it was confirmed that the batteries were highly reliable. The above-described evaluation shows that the occurrence of an internal short-circuit due to deformation of the battery case can be effectively prevented by setting the mixture ratio of manganese dioxide and graphite to be within a range of 92.6/7.4 to 94.0/6.0.

<<Evaluation 5>>

Next, the relationship between the water content of the positive electrode and the occurrence of an internal short-circuit was evaluated.

Table 9 shows the injection amount of the alkaline electrolyte and the water content (wt %) of the positive electrode for batteries used in the evaluation. Note that the respective thicknesses of the opening portion and the body portion of the battery case, the concentration of potassium hydroxide in the alkaline electrolyte, the filling height of the positive electrode and the height of the separator were the same for all of the batteries.

Note that the water content of the positive electrode was calculated by obtaining, after each battery was decomposed, the positive electrode containing the alkaline electrolyte was taken out from the battery, the positive electrode was pulverized into particles having a particle diameter of 1 mm or less and then the pulverized positive electrode was dried at 105° C. for 2 hours, the amount of water contained in the positive electrode from a weight difference between before and after the drying step.

[Table 9]

Table 10 shows evaluation results for open circuit voltage drop after a dropping test and heat generation for batteries which were formed so that the water content of the positive electrode were different between the batteries.

[Table 10]

As shown in Table 10, for batteries of Working Examples 28 through 30, the voltage did not drop even immediately after the batteries were dropped and it was confirmed that the batteries were highly reliable. The above-described evaluation shows that the occurrence of an internal short-circuit due to deformation of the battery case can be effectively prevented by setting the water content of the positive electrode to be within a range of 7.1 wt % to 8.1 wt %.

The present invention has been described by explaining preferred embodiments of the present invention. However, the description above is not given for the purpose of limiting the present invention and, as a matter of course, various modification of the present invention is possible. For example, in the above-described embodiment, as a package form of a battery pack, shrink package using a heat shrinkable film is used. However, even when a blister pack or a paper container is used, the same effects can be achieved. Moreover, needless to say, when a method in which assuming a pack including a plurality of batteries shrink-packaged to be a unit pack, a plurality of unit packs are arranged and further packaged by a second heat shrinkable film (an exterior film), i.e., so called "double shrink packaging is used, the present invention is applicable.

TABLE 1

| | | Battery case | | | Alkaline | Positive | Separator | |
| | | Thickness of opening portion (A) (mm) | Thickness of body portion (B) (mm) | $\frac{A-B}{A}$ (%) | electrolyte Potassium hydroxide (weight part) | electrode Filling height (mm) | Height before injection of electrolyte (mm) | Height after injection of electrolyte (mm) |
| | Battery | | | | | | | |
|---|---|---|---|---|---|---|---|---|
| Working Example | 1 | 0.18 | 0.15 | 17 | 30 | 40.5 | 44.6 | 44.5 |
| | 2 | 0.18 | 0.15 | 17 | 30 | 40.5 | 45.1 | 45.0 |
| | 3 | 0.18 | 0.15 | 17 | 30 | 40.5 | 45.6 | 45.5 |
| | 4 | 0.18 | 0.15 | 17 | 30 | 40.5 | 46.1 | 46.0 |
| | 5 | 0.22 | 0.10 | 55 | 30 | 40.5 | 44.6 | 44.5 |
| | 6 | 0.22 | 0.10 | 55 | 30 | 40.5 | 45.1 | 45.0 |
| | 7 | 0.22 | 0.10 | 55 | 30 | 40.5 | 45.6 | 45.5 |
| | 8 | 0.22 | 0.10 | 55 | 30 | 40.5 | 46.1 | 46.0 |

TABLE 1-continued

| | Battery | Battery case | | | Alkaline electrolyte Potassium hydroxide (weight part) | Positive electrode Filling height (mm) | Separator | |
|---|---|---|---|---|---|---|---|---|
| | | Thickness of opening portion (A) (mm) | Thickness of body portion (B) (mm) | $\frac{A-B}{A}$ (%) | | | Height before injection of electrolyte (mm) | Height after injection of electrolyte (mm) |
| Comparative Example | 9 | 0.18 | 0.18 | 0 | 30 | 40.5 | 44.6 | 44.5 |
| | 10 | 0.18 | 0.18 | 0 | 30 | 40.5 | 46.6 | 46.5 |
| | 11 | 0.22 | 0.22 | 0 | 30 | 40.5 | 44.6 | 44.5 |
| | 12 | 0.22 | 0.22 | 0 | 30 | 40.5 | 46.6 | 46.5 |

TABLE 2

| | Battery | Alkaline dry battery (separator after decomposition) | | | | | | Battery pack (test battery) | | |
|---|---|---|---|---|---|---|---|---|---|---|
| | | Designed value for bending length (mm) | L (mm) | H (mm) | R1 (mm) | R2 (mm) | R2 − R1 (mm) | Number of batteries in which open circuit voltage dropped | | Number of batteries in which heat was generated |
| | | | | | | | | Immediately after dropping battery | After a lapse of 1 min from dropping battery | |
| Working Example | 1 | 1.0 | 0.8 | 2.1 | 7.9 | 8.9 | 1.0 | 6 | 4 | 2 |
| | 2 | 1.5 | 1.4 | 2.1 | 7.4 | 8.9 | 1.5 | 2 | 0 | 0 |
| | 3 | 2.0 | 1.8 | 2.1 | 6.9 | 8.9 | 2.0 | 0 | 0 | 0 |
| | 4 | 2.5 | 2.3 | 2.1 | 6.4 | 8.9 | 2.5 | 0 | 0 | 0 |
| | 5 | 1.0 | 0.9 | 2.1 | 7.8 | 8.9 | 1.1 | 9 | 7 | 4 |
| | 6 | 1.5 | 1.3 | 2.1 | 7.4 | 8.9 | 1.5 | 4 | 0 | 0 |
| | 7 | 2.0 | 1.7 | 2.1 | 7.0 | 8.9 | 1.9 | 0 | 0 | 0 |
| | 8 | 2.5 | 2.2 | 2.1 | 6.5 | 8.9 | 2.4 | 0 | 0 | 0 |
| Comparative Example | 9 | 1.0 | 0.9 | 2.1 | 7.9 | 8.9 | 1.0 | 1 | 0 | 0 |
| | 10 | 2.5 | 2.4 | 2.1 | 6.3 | 8.9 | 2.6 | 0 | 0 | 0 |
| | 11 | 1.0 | 0.8 | 2.1 | 8.0 | 8.9 | 0.9 | 0 | 0 | 0 |
| | 12 | 2.5 | 2.3 | 2.1 | 6.2 | 8.9 | 2.7 | 0 | 0 | 0 |

TABLE 3

| | Battery | Battery case | | | Alkaline electrolyte Potassium hydroxide (weight part) | Positive electrode Filling height (mm) | Separator | |
|---|---|---|---|---|---|---|---|---|
| | | Thickness of opening portion (A) (mm) | Thickness of body portion (B) (mm) | $\frac{A-B}{A}$ (%) | | | Height before injection of electrolyte (mm) | Height after injection of electrolyte (mm) |
| Working Example | 6 | 0.22 | 0.10 | 55 | 30 | 40.5 | 45.1 | 45.0 |
| | 13 | 0.22 | 0.10 | 55 | 30 | 40.8 | 45.1 | 45.0 |
| | 14 | 0.22 | 0.10 | 55 | 30 | 41.1 | 45.1 | 45.0 |
| | 15 | 0.22 | 0.10 | 55 | 30 | 41.5 | 45.1 | 45.0 |

TABLE 4

| | Battery | Alkaline dry battery (separator after decomposition) | | | | | | Battery pack (test battery) | | |
|---|---|---|---|---|---|---|---|---|---|---|
| | | Designed value for bending length (mm) | L (mm) | H (mm) | R1 (mm) | R2 (mm) | R2 − R1 (mm) | Number of batteries in which open circuit voltage dropped | | Number of batteries in which heat was generated |
| | | | | | | | | Immediately after dropping battery | After a lapse of 1 min from dropping battery | |
| Working Example | 6 | 1.5 | 1.3 | 2.1 | 7.4 | 8.9 | 1.5 | 4 | 0 | 0 |
| | 13 | 1.5 | 1.3 | 1.8 | 7.4 | 8.9 | 1.5 | 1 | 0 | 0 |
| | 14 | 1.5 | 1.3 | 1.5 | 7.4 | 8.9 | 1.5 | 0 | 0 | 0 |
| | 15 | 1.5 | 1.3 | 1.1 | 7.4 | 8.9 | 1.5 | 0 | 0 | 0 |

TABLE 5

| | | Battery case | | | Alkaline electrolyte Potassium hydroxide (weight part) | Positive electrode Filling height (mm) | Separator | |
|---|---|---|---|---|---|---|---|---|
| | Battery | Thickness of opening portion (A) (mm) | Thickness of body portion (B) (mm) | $\frac{A-B}{A}$ (%) | | | Height before injection of electrolyte (mm) | Height after injection of electrolyte (mm) |
| Working Example | 6 | 0.22 | 0.10 | 55 | 30 | 40.5 | 45.1 | 45.0 |
| | 16 | 0.22 | 0.10 | 55 | 31 | 40.5 | 45.1 | 45.0 |
| | 17 | 0.22 | 0.10 | 55 | 32 | 40.5 | 45.1 | 45.0 |
| | 18 | 0.22 | 0.10 | 55 | 34 | 40.5 | 45.1 | 45.0 |
| | 19 | 0.22 | 0.10 | 55 | 36 | 40.5 | 45.1 | 45.1 |

TABLE 6

| | | Alkaline dry battery (separator after decomposition) | | | | | | Battery pack (test battery) | | |
|---|---|---|---|---|---|---|---|---|---|---|
| | | | | | | | | Number of batteries in which open circuit voltage dropped | | Number of batteries in which heat was generated |
| | Battery | Designed value for bending length (mm) | L (mm) | H (mm) | R1 (mm) | R2 (mm) | R2 − R1 (mm) | Immediately after dropping battery | After a lapse of 1 min from dropping battery | |
| Working Example | 6 | 1.5 | 1.3 | 2.1 | 7.4 | 8.9 | 1.5 | 4 | 0 | 0 |
| | 16 | 1.5 | 1.3 | 2.1 | 7.4 | 8.9 | 1.5 | 2 | 0 | 0 |
| | 17 | 1.5 | 1.3 | 2.1 | 7.4 | 8.9 | 1.5 | 0 | 0 | 0 |
| | 18 | 1.5 | 1.3 | 2.1 | 7.4 | 8.9 | 1.5 | 0 | 0 | 0 |
| | 19 | 1.5 | 1.3 | 2.1 | 7.4 | 8.9 | 1.5 | 0 | 0 | 0 |

TABLE 7

| | | Battery case | | | Alkaline electrolyte Potassium hydroxide (weight part) | Positive electrode | | Separator | |
|---|---|---|---|---|---|---|---|---|---|
| | Battery | Thickness of opening portion (A) (mm) | Thickness of body portion (B) (mm) | $\frac{A-B}{B}$ (%) | | Mixture ratio between manganese dioxide and graphite | Filling height (mm) | Height before injection of electrolyte (mm) | Height after injection of electrolyte (mm) |
| Working Example | 20 | 0.22 | 0.10 | 55 | 30 | 95.0:5.0 | 40.5 | 45.1 | 45.0 |
| | 6 | 0.22 | 0.10 | 55 | 30 | 94.0:6.0 | 40.5 | 45.1 | 45.0 |
| | 21 | 0.22 | 0.10 | 55 | 30 | 93.8:6.2 | 40.5 | 45.1 | 45.0 |
| | 22 | 0.22 | 0.10 | 55 | 30 | 93.4:6.6 | 40.5 | 45.1 | 45.0 |
| | 23 | 0.22 | 0.10 | 55 | 30 | 93.0:7.0 | 40.5 | 45.1 | 45.0 |
| | 24 | 0.22 | 0.10 | 55 | 30 | 92.8:7.2 | 40.5 | 45.1 | 45.0 |
| | 25 | 0.22 | 0.10 | 55 | 30 | 92.6:7.4 | 40.5 | 45.1 | 45.0 |
| | 26 | 0.22 | 0.10 | 55 | 30 | 92.0:8.0 | 40.5 | 45.1 | 45.0 |

TABLE 8

| | | Alkaline dry battery (separator after decomposition) | | | | | | Battery pack (test battery) | | |
|---|---|---|---|---|---|---|---|---|---|---|
| | | | | | | | | Number of batteries in which open circuit voltage dropped | | Number of batteries in which heat was generated |
| | Battery | Designed value for bending length (mm) | L (mm) | H (mm) | R1 (mm) | R2 (mm) | R2 − R1 (mm) | Immediately after dropping battery | After a lapse of 1 min from dropping battery | |
| Working Example | 20 | 1.5 | 1.3 | 2.1 | 7.4 | 8.9 | 1.5 | 5 | 0 | 0 |
| | 6 | 1.5 | 1.3 | 2.1 | 7.4 | 8.9 | 1.5 | 4 | 0 | 0 |
| | 21 | 1.5 | 1.3 | 2.1 | 7.4 | 8.9 | 1.5 | 0 | 0 | 0 |
| | 22 | 1.5 | 1.3 | 2.1 | 7.4 | 8.9 | 1.5 | 0 | 0 | 0 |
| | 23 | 1.5 | 1.3 | 2.1 | 7.4 | 8.9 | 1.5 | 0 | 0 | 0 |
| | 24 | 1.5 | 1.3 | 2.1 | 7.4 | 8.9 | 1.5 | 0 | 0 | 0 |
| | 25 | 1.5 | 1.3 | 2.1 | 7.4 | 8.9 | 1.5 | 2 | 0 | 0 |
| | 26 | 1.5 | 1.3 | 2.1 | 7.4 | 8.9 | 1.5 | 3 | 0 | 0 |

TABLE 9

| | Battery | Battery case | | | Alkaline electrolyte | | Positive electrode | | Separator | |
|---|---|---|---|---|---|---|---|---|---|---|
| | | Thickness of opening portion (A) (mm) | Thickness of body portion (B) (mm) | $\frac{A-B}{B}$ (%) | Potassium hydroxide (weight part) | Injection amount (g) | Water content (%) | Filling height (mm) | Height before injection of electrolyte (mm) | Height after injection of electrolyte (mm) |
| Working Example | 27 | 0.22 | 0.10 | 55 | 30 | 1.70 | 8.4 | 40.5 | 45.1 | 45.0 |
| | 6 | 0.22 | 0.10 | 55 | 30 | 1.65 | 8.1 | 40.5 | 45.1 | 45.0 |
| | 28 | 0.22 | 0.10 | 55 | 30 | 1.60 | 7.9 | 40.5 | 45.1 | 45.0 |
| | 29 | 0.22 | 0.10 | 55 | 30 | 1.55 | 7.5 | 40.5 | 45.1 | 45.0 |
| | 30 | 0.22 | 0.10 | 55 | 30 | 1.50 | 7.1 | 40.5 | 45.1 | 45.0 |

TABLE 10

| | | Alkaline dry battery (separator after decomposition) | | | | | Battery pack (test battery) | | |
|---|---|---|---|---|---|---|---|---|---|
| | | | | | | | Number of batteries in which open circuit voltage dropped | | Number of |
| | Battery | Designed value for bending length (mm) | L (mm) | H (mm) | R1 (mm) | R2 (mm) | R2 − R1 (mm) | Immediately after dropping battery | After a lapse of 1 min from dropping battery | batteries in which heat was generated |
| Working Example | 27 | 1.5 | 1.3 | 2.1 | 7.4 | 8.9 | 1.5 | 5 | 0 | 0 |
| | 6 | 1.5 | 1.3 | 2.1 | 7.4 | 8.9 | 1.5 | 4 | 0 | 0 |
| | 28 | 1.5 | 1.3 | 2.1 | 7.4 | 8.9 | 1.5 | 0 | 0 | 0 |
| | 29 | 1.5 | 1.3 | 2.1 | 7.4 | 8.9 | 1.5 | 0 | 0 | 0 |
| | 30 | 1.5 | 1.3 | 2.1 | 7.4 | 8.9 | 1.5 | 0 | 0 | 0 |

What is claimed is:

1. An alkaline battery in which a positive electrode and a gelled negative electrode are stored with a separator interposed therebetween in a battery case having a cylindrical shape with a bottom and an opening portion of the battery case is sealed with a gasket,
wherein the battery case is formed so that a thickness of a body portion thereof is smaller than a thickness of an opening portion thereof,
the gasket includes a center portion for holding a negative electrode current collector, an outer circumference portion in contact with the opening portion of the battery case and a connection portion for connecting the center potion and the outer circumference portion,
an edge portion of the separator is in contact with the connection portion and bent toward the center portion and contact part of the edge portion with the connection portion has a length in a range of 1.5 mm to 2.5 mm, and
the positive electrode contains at least manganese dioxide and graphite and a mixture ratio by weight of manganese dioxide and graphite is within a range of 92.6/7.4 to 94.0/6.0.

2. An alkaline battery in which a positive electrode and a gelled negative electrode are stored with a separator interposed therebetween in a battery case having a cylindrical shape with a bottom and an opening portion of the battery case is sealed with a gasket,
wherein the battery case is formed so that a thickness of a body portion thereof is smaller than a thickness of an opening portion thereof,
the gasket includes a center portion for holding a negative electrode current collector, an outer circumference portion in contact with the opening portion of the battery case and a connection portion for connecting the center potion and the outer circumference portion,
an edge portion of the separator is in contact with the connection portion and bent toward the center portion and contact part of the edge portion with the connection portion has a length in a range of 1.5 mm to 2.5 mm, and
the positive electrode contains an alkaline electrolyte containing water as a solvent and a water content of the positive electrode is within a range of 7.1 wt % to 8.1 wt %.

3. An alkaline battery in which a positive electrode and a gelled negative electrode are stored with a separator interposed therebetween in a battery case having a cylindrical shape with a bottom and an opening portion of the battery case is sealed with a gasket,
wherein the battery case is formed so that a thickness of a body portion thereof is smaller than a thickness of an opening portion thereof,
the gasket includes a center portion for holding a negative electrode current collector, an outer circumference portion in contact with the opening portion of the battery case and a connection portion for connecting the center potion and the outer circumference portion,
an edge portion of the separator is in contact with the connection portion and bent toward the center portion and contact part of the edge portion with the connection portion has a length in a range of 1.5 mm to 2.5 mm, and
the separator is formed of a material containing polyvinyl alcohol fiber and a concentration of potassium hydroxide in an alkaline electrolyte contained in the separator is within a range of 32 to 36 weight parts.

4. A battery pack comprising a plurality of alkaline batteries of claim 3 being packaged using shrink-packaging technique, blister packaging technique or a paper container.

* * * * *